May 4, 1926.
F. EIDEN
OIL CUP
Filed March 30, 1925
1,583,678
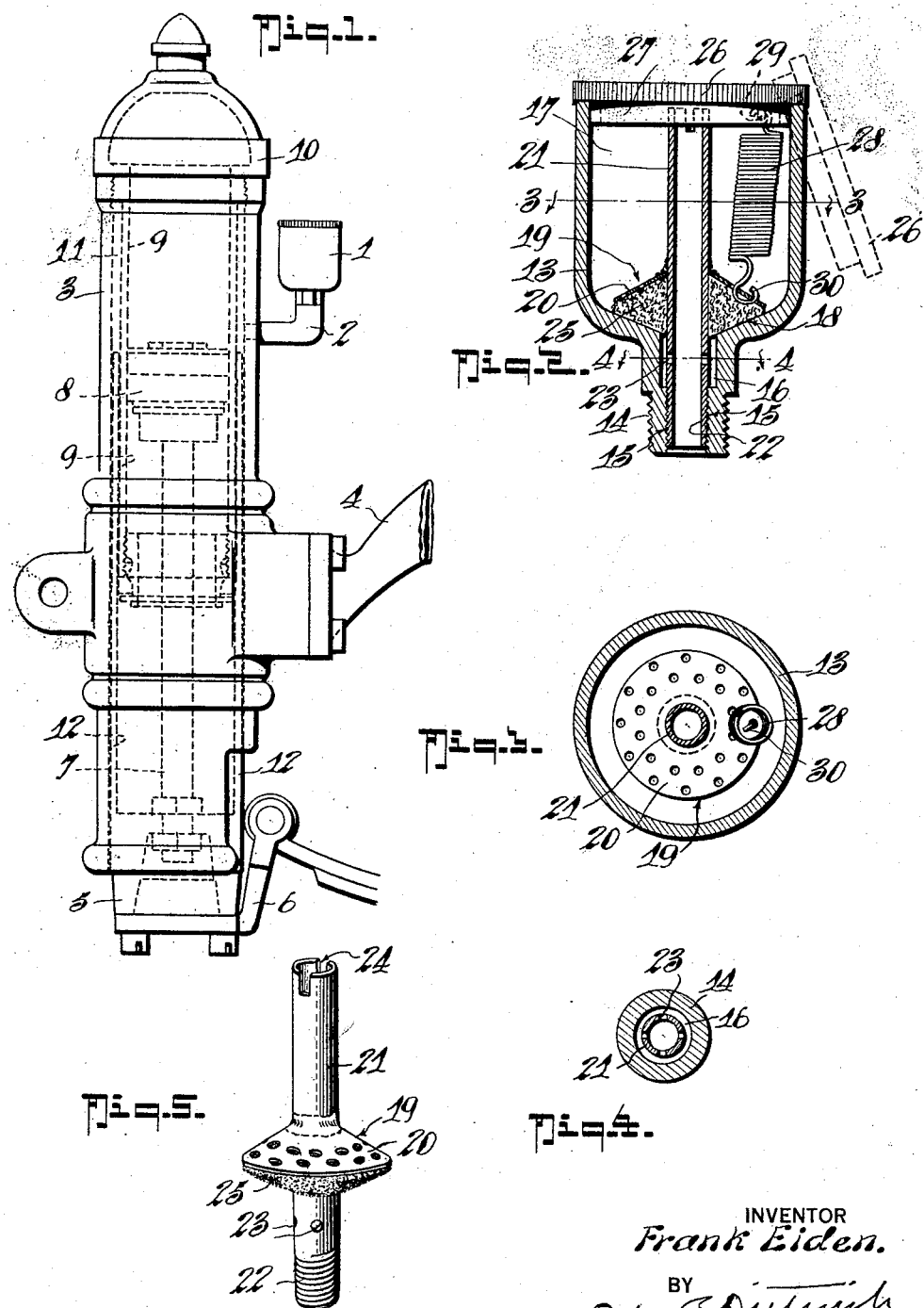
INVENTOR
*Frank Eiden.*
BY
ATTORNEY Patented May 4, 1926.

1,583,678

UNITED STATES PATENT OFFICE.

FRANK EIDEN, OF REDDING, CALIFORNIA.

OIL CUP.

Application filed March 30, 1925. Serial No. 19,518.

*To all whom it may concern:*

Be it known that I, FRANK EIDEN, a citizen of the United States, residing at Redding, in the county of Shasta and State of California, have invented a new and Improved Oil Cup, of which the following is a specification.

The invention generally relates to oil cups and has for its primary object to provide a simple and effective type of oil cup particularly adaptable to use in connection with shock absorbers, which is readily adjustable for controlling the manner of feeding of the lubricant to the desired parts, and which serves to provide the desired lubrication of the parts without any interference by the suctions and compressions imparted by the moving parts in connection with which the same is mounted.

In its more detailed nature, the invention seeks to provide an oil cup in which provision is made for bleed or filter feeding the lubricant to the desired parts, such bleed or filter feed being adjustable for accurately controlling the time necessary for a "fill" of oil to be used up from the cup regardless of the forces acting to quickly suck the lubricant from the cup all at once or to pressure expel the same out of that cup, means being also provided whereby an additional amount of lubricant may be freely transmitted to the parts independently of but through the bleed or filter feeding feature. The suction and compression dissipation, the bleed or filter feed adjustment, and the free lubrication being provided for by a single simple structural feature.

With the above and other objects in view that will hereinafter appear, the invention further resides in the novel details of construction first fully described in the following detailed description, then particularly pointed out in the appended claims, reference being had to the accompanying drawing, in which:—

Figure 1 is a somewhat diagrammatic side elevation illustrating a use to which the invention is adaptable.

Figure 2 is a central vertical section of my improved oil cup structure.

Figures 3 and 4 are horizontal cross sections taken on the lines 3—3 and 4—4 respectively on Figure 2.

Figure 5 is a detail perspective view of the bleed or filter feed providing and controlling and free lubricant passing structure adjustably mountable within the oil cup body.

In Figure 1 of the drawing I have illustrated one adaptation of my invention. In this figure, the invention is shown as used upon a shock absorber of the air cushion shock absorbing type. This adaptation of the invention will serve to illustrate its peculiar operative advantages and has therefore been selected as a means of more efficiently illustrating the said invention.

In the somewhat diagrammatic illustration I have made in Figure 1, 1 generally indicates the oil cup and 2 the connection whereby the same is cooperatively mounted upon the shock absorber casing 3, the said casing being rigidly secured upon the automobile on which the same is used as at 4.

A vertically reciprocal piston body 5 is mounted in the casing 3 and projects below the lower end thereof where it is secured as at 6 to the respective spring of the vehicle so that when the same is vertically reciprocated the shock absorbed through the said spring will be air cushioned absorbed by the said shock absorber. The body 5 has secured thereto, to extend centrally vertically therefrom, a piston rod 7 which has secured to the upper end thereof a shock absorbing piston 8 vertically reciprocal in the sleeve 9 depending from the closure cap 10 and which is so carried by that closure cap as to be spaced concentrically inward of the outer wall of the casing 3 to provide an annular space 11 in which the sleeve 12, which extends vertically from the head 5, is slidable.

It will be quite obvious that as the piston 8 and sleeve 12 are caused to reciprocate relatively to the casing 3 and under the shocks incident to travel over rough highways, compression or suction will be created above the sleeve 12 in the annular space 11, according to the direction of reciprocation of that sleeve. In other words, as the sleeve 12 is caused to slide upwardly in the space 11 any fluid in that space will be compressed and forcibly ejected from that space through any crevice that may be present while, on the other hand, when the sleeve is moved downwardly a partial vacuum will be created in the space 11 which will tend to draw in fluid through any crevice that may be present. It will be just as obvious that if a common type of oil cup was used to lubricate the slidable parts of the absorber and connected in communication with the space 11, as indicated in Figure 1 of the drawing, upward movement of the sleeve 12 would act to forcibly eject the oil from the cup and spatter the same over the adjacent portions of the body of the machine upon which the absorber was mounted. The reverse action or down stroke of the sleeve 12 would serve to suck all of the oil from the cup 1 at once which, of course, would be very undesirable.

In carrying out the principles of my invention, I provide an oil cup having a body or casing 13, a downwardly extended and threaded stem 14, whereby operative connection of the oil cup may be facilitated, a small threaded bore 15, a counterbore 16 and a relatively large oil chamber 17 having a somewhat conical seat forming bottom 18.

To prevent free flow of the oil from the chamber 17 and to provide for a bleeding or filter feed of the oil therefrom, I provide a substantially conical metal disk 19 perforated at 20 and secured to be carried by the hollow central tube 21. The lower end of the hollow tube is threaded as at 22 for cooperating with the threaded bore 15 of the casing, has a plurality of small apertures 23 adapted to communicate with the counterbore 16, and has the upper end thereof extended to approximately the top of the casing and cross slotted as at 24 to facilitate the insertion of a screw driver or the like for turning the said tube for a purpose soon to be described. A packer 25 of felt or similar material is mounted in the chamber 17 surrounding the central tube 21 and which said packer is inserted between the perforated disk 19—20 and the substantially coniform seat 18.

From the foregoing description, it will be obvious that the oil which flows from the cup chamber 17 must pass through the perforated disk 19—20, the packer 25, counterbore 16, apertures 23 and the lower threaded end of the tube 21. Thus a bleed or filter feeding of the oil is provided making it impossible for suction or compression to be imparted to the chamber 17 of the oil cup by reason of action of the shock absorber parts, as hereinbefore described, such as would cause either a quick discharge of all of the oil from the cup or a quick ejection of that oil from the cup, both of which deficiencies would be common in ordinary types of oil cup, of course, are most undesirable. It will be obvious that by inserting a screw driver into the slot 24 of the tube 21 and turning the same in its screw connection 15—22, the rigid disk 19 would be caused to increase or relieve pressure against the packer 25. Obviously by increasing pressure on the packer against its coniform seat the same will be compacted or rendered relatively more dense and provide for a much slower bleed of the oil from the chamber 17, while a reverse action or a relieving of the pressure against that disk would allow the fibres thereof to expand and permit more free passage of the oil therethrough.

In this manner, the feeding of oil to the parts to be lubricated may be controlled to a nicety.

It will also be readily apparent, by reference to Figure 2 of the drawing, that the tubular member 21 provides a free central passage for oil through which oil may be introduced directly to the parts to be lubricated without passing through the filter or bleed feed devices. This feature is also particularly desirable in that it will make possible the filling of the oil cup to capacity and the free introduction of an additional amount of lubricating oil directly to the parts to be lubricated, thus increasing the capacity of the oil cup and providing for a primary flushing of the parts to be lubricated with kerosene or the like if it be so desired. Also, the free central passage provided by the tube 21 provides for a free air passage either under suction or compression action so that all suction and compression actions, which would ordinarily be imparted to a common type of oil cup and which would overcome the desired feeding of lubricant therefrom, will be dissipated in my improved type of oil cup, through the said central passage provided by the tube 21.

A non-threaded closure cap 26 is provided for the oil cup and has a depending flange 27 for fitting within the upper portion of the oil chamber 17. A spring 28 secured to an off-center lug 29 depending from the cap and as at 30 to the perforated disk 19 serves to readily removably hold the said cap to position upon the oil cup in the manner illustrated in full lines in Figure 2 of the drawing, by reason of providing the off-centered lug 29, when it is desired to replenish the supply of oil in the cup, the cap 26 may be readily lifted and turned a half turn and the lug 29 thereof brought into engagement with the adjacent wall of the casing 13, when the spring will effectively serve to hold the cap to its open position illustrated in dotted lines in the said figure.

In the foregoing description and drawing I have disclosed a simple and effective oil cup construction in which means is provided for adjustably bleed or filter feeding the oil to the parts to be lubricated, a simple and effective means for adjusting said feed, means for providing a free passage of oil to the parts to be lubricated independently of the said bleed or filter feeding features and through which means suctions and compressions which would ordinarily be imparted to the interior of the oil cup in a troublesome manner are dissipated and a simply removable open held closure cap are provided.

From the foregoing description referred to, taken in connection with the accompanying drawings, it is thought that all of the novel details of construction of my invention and the manner of use thereof will be readily apparent to those familiar with the art to which it relates.

What I claim is:

1. An oil cup of the class described comprising a casing adapted to receive lubricant, compressible means for filter feeding the lubricant from the casing, means whereby lubricant may be freely fed through said casing independently of said filter feeding means, said last named means being in the nature of a hollow tube extending from the upper end of the cup casing down to and connected with the discharge thereof, and means whereby said hollow tube may be adjusted to vary the compressed nature of said filter feeding means.

2. An oil cup of the class described comprising a casing bored to provide an oil receiving chamber having a somewhat conical bottom, a counterbore providing an oil receiving pocket, and a small threaded bore providing an oil discharge passage; a hollow tube having a threaded lower end for threading into the threaded bore of the casing, said tube extending approximately to the top of the casing and having a plurality of apertures in communication with the counter bore of said casing; a filter packer seated on the conical bottom of the oil chamber; and a perforated disk mounted on the hollow tube above the packer for holding the same in position; substantially as shown and for the purposes described.

3. In an oil cup of the class described wherein is provided a casing open at its top and having a discharge opening at its bottom, a tube for passing oil through the cup and having its lower end in communication with the casing discharge opening and its upper end extended to approximately the level of the casing top, a cover for closing the open top of the casing and adapted to be positioned closely adjacent the upper end of said tube for restricting communication between said tube end and the interior of the casing, and a light spring connected directly to said cover by an off-center lug and anchored at its other end within the casing.

4. As a new article of manufacture; a filter feed device comprising a hollow tube having its lower end adapted for being secured in the outlet passage of an oil cup, said tube being of a length for extending approximately to the top of such oil cup as the device is adapted to be mounted in and having oil passing apertures in its wall adjacent its lower end, a filter-packer carried on said tube above said apertures, and a disk mounted on the tube above the packer.

5. As a new article of manufacture; a filter-feed device comprising a hollow tube having its lower end threaded to adapt the same for being secured in the outlet passage of an oil cup, said tube being of a length for extending approximately to the top of such oil cup as the device is adapted to be mounted in and having oil passing apertures in its wall adjacent its lower end, a filter packer carried on said tube above said apertures, and a disk mounted on the tube above the packer, said tube being cross-slotted at its upper end.

FRANK EIDEN.